Nov. 1, 1966   H. W. REHR   3,282,525
WEB SLITTING AND GROOVING APPARATUS AND METHOD
Filed Sept. 23, 1963   9 Sheets-Sheet 1

INVENTOR.
HENRY W. REHR
BY
Bialos & Schlemmer
Attorneys

INVENTOR.
HENRY W. REHR
BY
Bialos & Schlemmer
Attorneys

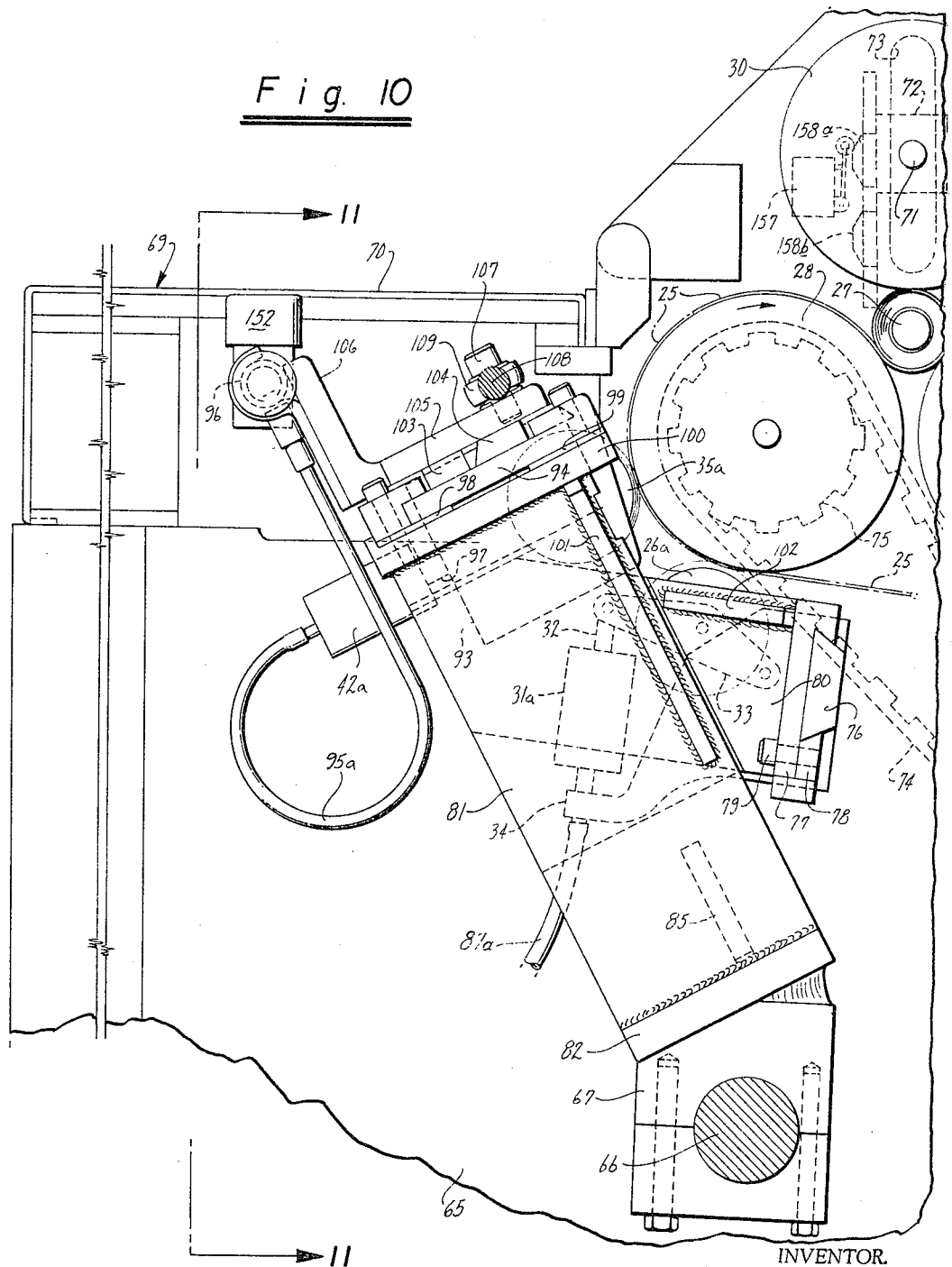

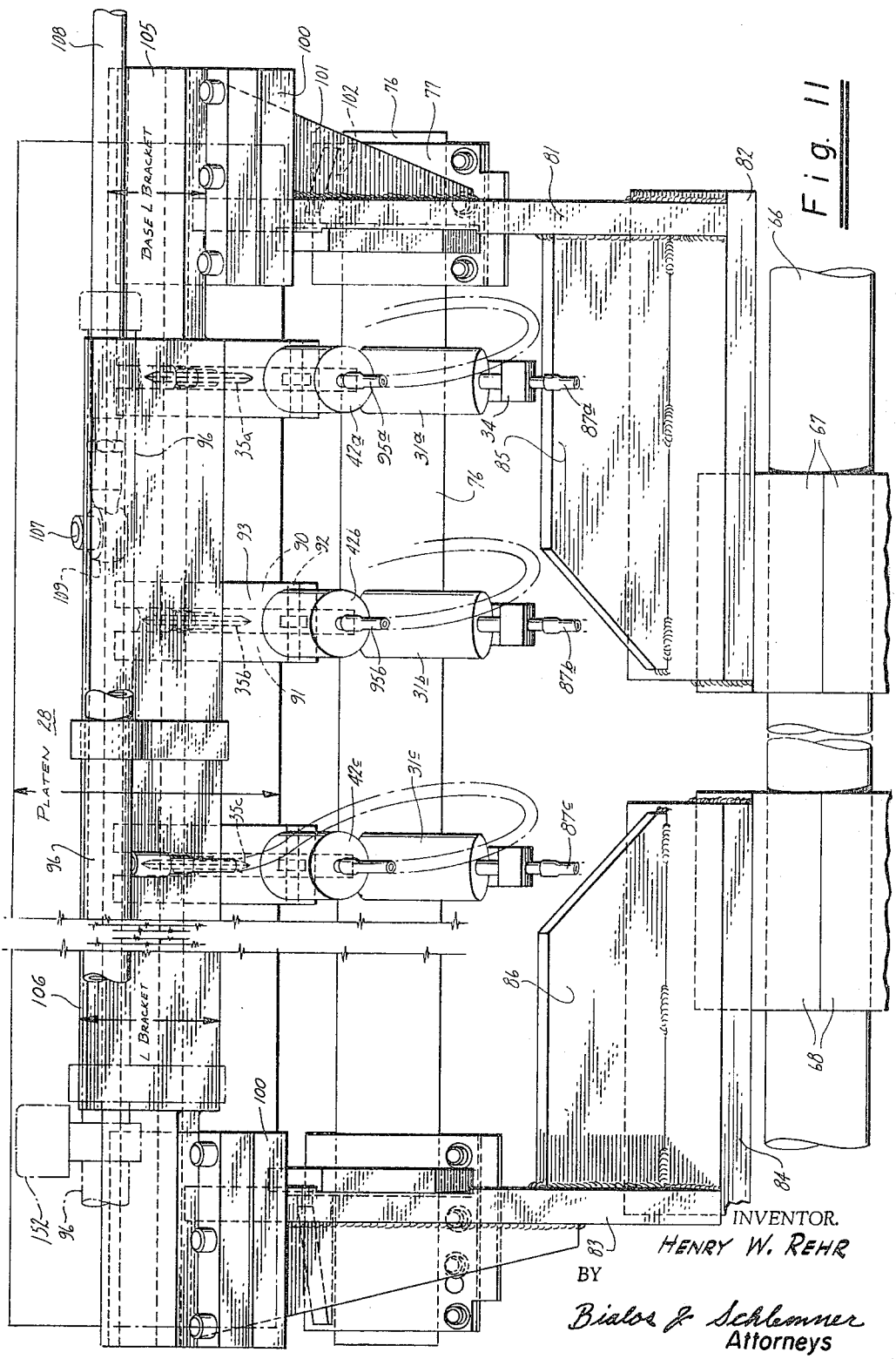

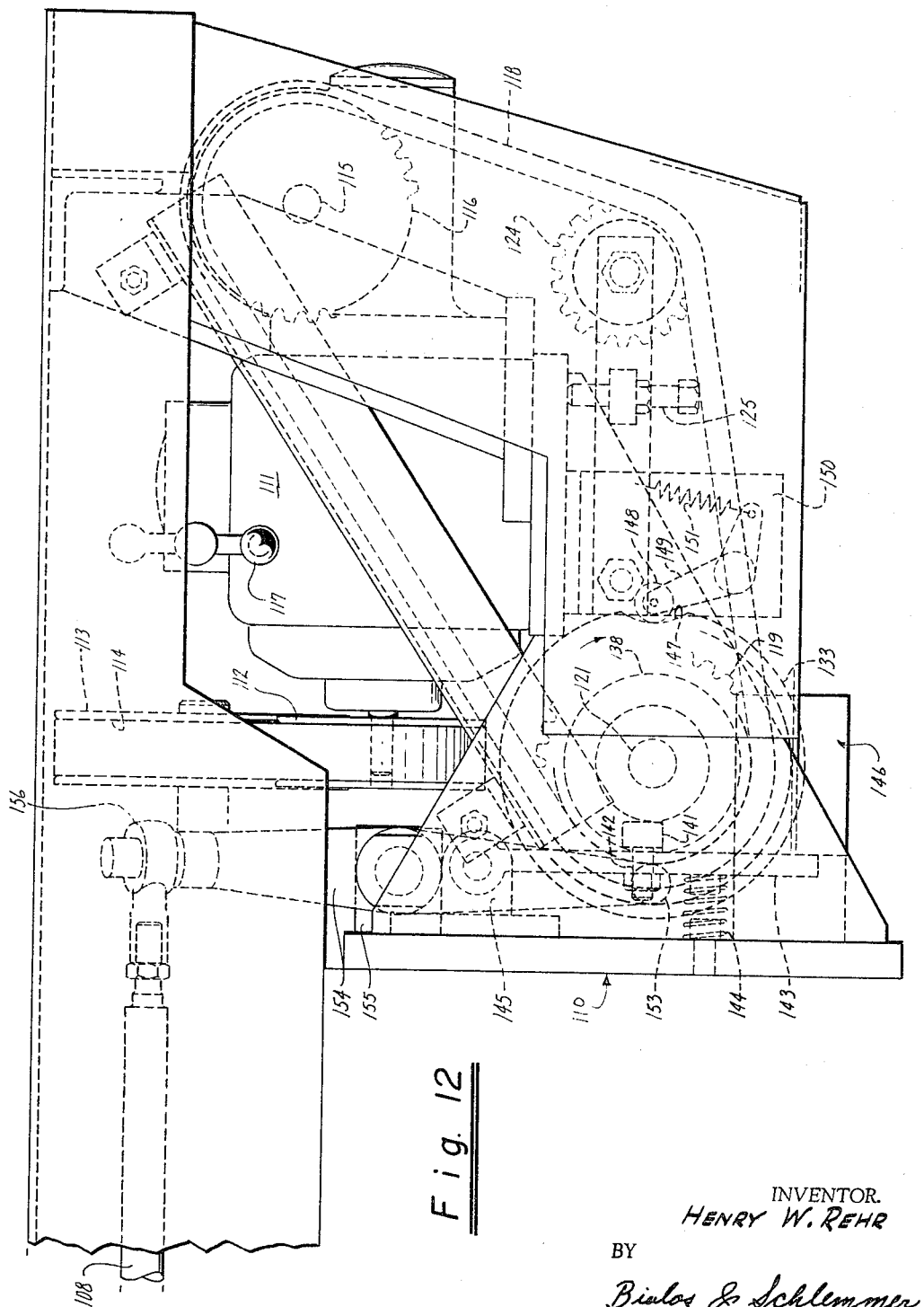

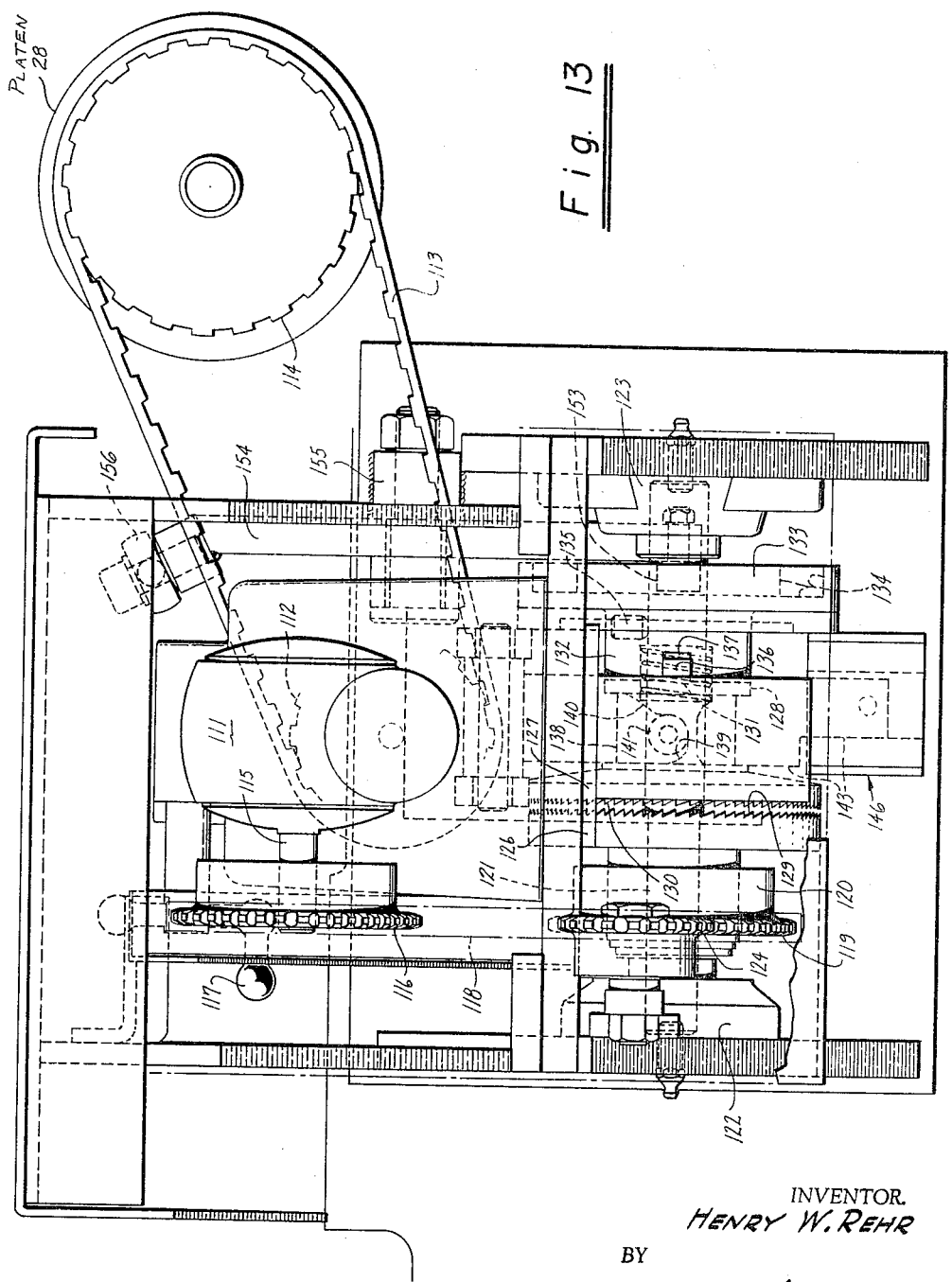

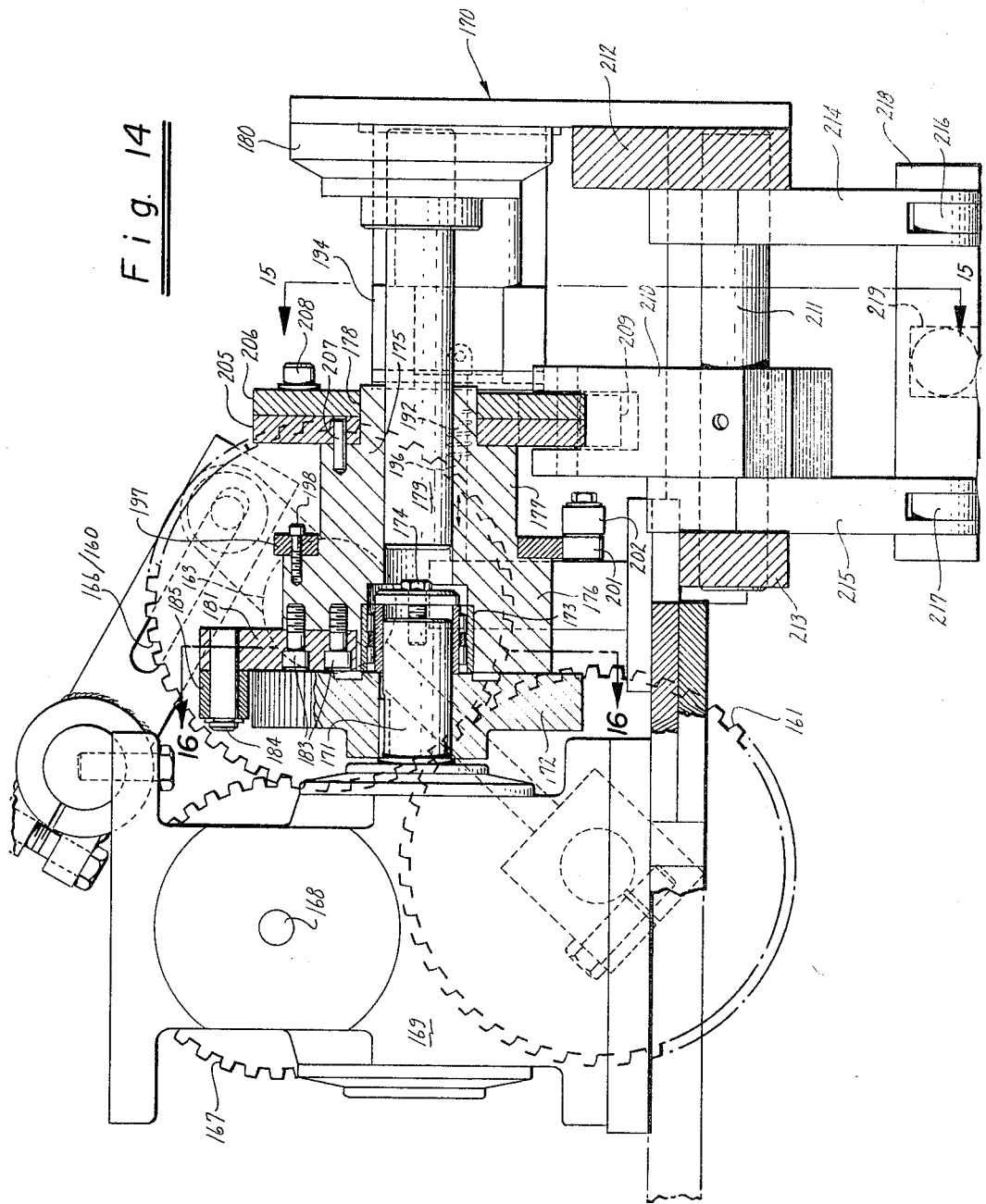

INVENTOR.
HENRY W. REHR
BY
Bialos & Schlemmer
Attorneys

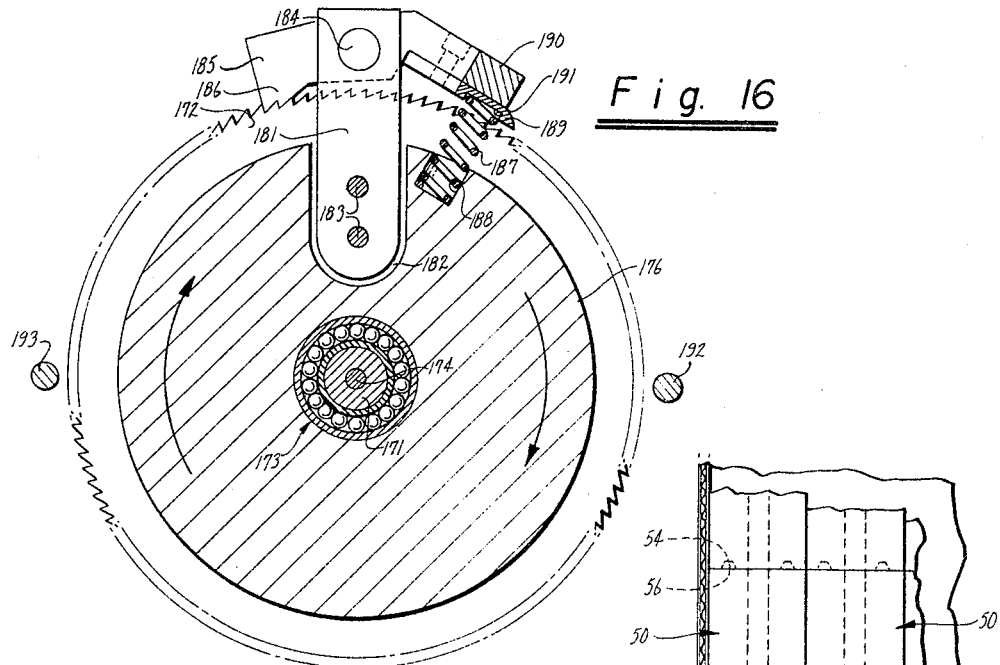
Fig. 16
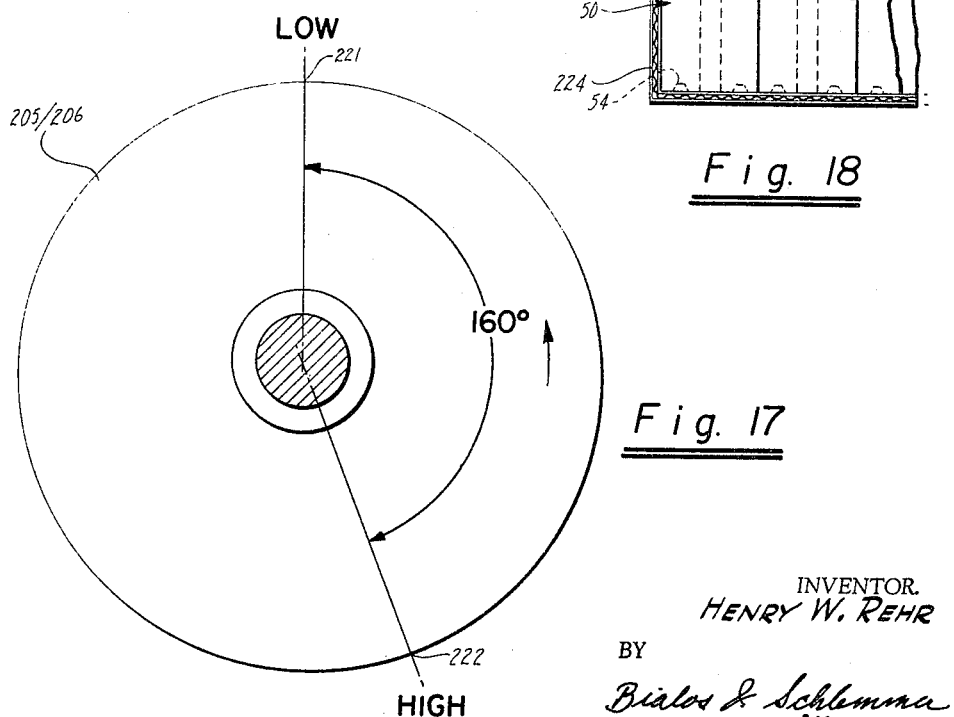
Fig. 18
Fig. 17

United States Patent Office 3,282,525
Patented Nov. 1, 1966

3,282,525
WEB SLITTING AND GROOVING APPARATUS AND METHOD
Henry W. Rehr, Concord, Calif., assignor to Crown Zellerbach Corporation, San Francisco, Calif., a corporation of Nevada
Filed Sept. 23, 1963, Ser. No. 310,794
41 Claims. (Cl. 242—56.2)

This invention relates to a web rewinding system and, more particularly, to apparatus for and a method of slitting a continuous web into predetermined width in a manner such that a groove is provided at one end (or a groove at one end and a chuck at the other end) of each of a plurality of individual rolls formed by rewinding such slitted web, usually upon a segmented core. The system is especially useful in forming a plurality of rolls of paper toweling in a single web slitting and rewinding operation, but is applicable in forming rolled paper generally—other examples thereof being counter rolls of wrapping paper, and toilet tissue.

In public washrooms, paper toweling in roll form is usually dispensed from closed and locked cabinets to prevent unauthorized removal therefrom of full or partially full rolls. This necessitates periodic inspection of such cabinets and refilling thereof when empty; but since it is difficult to predict accurately the rate at which toweling is used, it has not been uncommon in the past to find the supply of toweling exhausted even though the cabinets are inspected regularly. However, an improved dispensing cabinet for rolled paper toweling is now in use which provides a positive indication as to when a roll of toweling is almost exhausted, and which also permits a full roll of toweling to be inserted, without first removing the partially exhausted roll, and made ready for use immediately and without further attention whenever the partially filled roll is depleted.

Such improved dispensing cabinets employ a specially designed mounting arrangement for the roll of toweling which automatically releases the roll therefrom after it is partially depleted, thereby permitting the roll to fall to the bottom of the cabinet where its location can be detected visually or by touch. In such position of the partially depleted roll, the remaining length of toweling may be withdrawn therefrom and dispensed in the ordinary manner, and at the same time a full roll of toweling may be mounted in the cabinet and the leading end of such roll threaded through the cabinet mouth so that it is in position for immediate use. The roll-mounting arrangement that permits a partially depleted roll of toweling to fall to the bottom of the cabinet requires cooperative mounting elements respectively provided by the cabinet and roll, and the particular cabinet described is equipped with a chuck that nests within a registering groove provided by the toweling roll in an end thereof. As the toweling is used, the groove is progressively opened along the outer side thereof which ultimately causes the roll to be released from the chuck thereby permitting the roll to fall to the bottom of the cabinet.

Heretofore, the requisite groove has been formed in the end of each roll of toweling subsequent to the web rewinding operation, and as a completely separate operation. This procedure has been unsatisfactory economically because it requires the use of additional machinery; and in necessitating a separate operation, requires rehandling of the rolls which, quite apparently, is costly. Additionally, however, it is difficult to cut a groove in a roll of paper toweling and the cutting tools used for this purpose are found to dull very quickly, they form ragged grooves, and during the grooving operation sufficient heat is developed to cause the paper to smoke which results in an offensive odor that permeates the toweling and seriously disturbs adjacent personnel.

In view of the foregoing, an object of the present invention is to provide an improved web rewinding apparatus and method especially suited for use in the formation of rolls of paper toweling of the type described.

Another object of the invention is in the provision of apparatus for and a method of winding groove-equipped rolls of paper toweling from a continuous web, and in which such web is slitted into predetermined widths in a manner such that a groove is provided in each roll all as part of the web rewinding operation.

Still another object is that of providing a web rewinding apparatus and method of the character described, in which the web is slitted into appropriate roll widths and is also slitted so that a groove is automatically defined in an end of each roll of toweling as the web is wound about a core-equipped mandrel.

A further object is to provide a web rewinding system of the type described in which, in a single operation, a web is slitted into appropriate roll lengths, and is also slitted (preferably as part of the same severing operation) such that a groove is formed in one end of each roll and a chuck formed on the opposite end thereof as the web is wound about a core-equipped mandrel.

Yet a further object is in the provision of a web rewinding system as described, which is readily adjustable so that grooves and chucks of selected radial dimension (with respect to the toweling rolls) can be furnished, and which is also selectively adjustable to permit the radial location of the grooves and chucks to be determined in accordance with the diameter of the rolls being formed.

Additional objects and advantages of the invention will become apparent as the specification develops.

Embodiments of the invention are illustrated in the accompanying drawings, in which—

FIGURE 1 is an end view in elevation of a roll of paper toweling having a groove formed in an end thereof;
FIGURE 2 is a longitudinal sectional view of the roll of toweling taken along the plane 2—2 of FIGURE 1;
FIGURE 3 is a diagrammatic view in broken top plan illustrating the method of severing a web so as to form a plurality of groove-equipped rolls therefrom;
FIGURE 4 is a diagrammatic view in side elevation of apparatus for effectuating the severing operation shown in FIGURE 3;
FIGURE 5 is an end view in elevation of a modified roll of paper toweling of the type having a groove at one end and a chuck at the opposite end, the chuck-equipped end being shown in this figure;
FIGURE 6 is an end view in elevation showing the groove-equipped end of the modified roll;
FIGURE 7 is a longitudinal sectional view taken along the plane 7—7 of FIGURE 6;
FIGURE 8 is a diagrammatic view in broken top plan illustrating the method of severing a web so as to form a plurality of rolls respectively provided with a groove at one end and a chuck at the opposite end;
FIGURE 9 is a diagrammatic view in side elevation of apparatus for effectuating the severing operation shown in FIGURE 8;
FIGURE 10 is essentially an end view in elevation, with the end plate removed, of knife-equipped web rewinding apparatus;
FIGURE 11 is a partial front view in elevation of the apparatus shown in FIGURE 10, the view being taken along the plane 11—11 of FIGURE 10 and certain components being omitted for clarity of illustration;
FIGURE 12 is a front view in elevation of the actuating mechanism controlling the groove-slitting knife;
FIGURE 13 is an end view in elevation of the actuating mechanism shown in FIGURE 12, the view being taken from right to left and the cover plate being broken away to reveal the interior of the mechanism;

FIGURE 14 is an end view in elevation of a modified actuating mechanism;

FIGURE 16 is a sectional view taken generally along the plane 16—16 of FIGURE 14;

FIGURE 17 is a plan view of the cam particularly used in the actuating mechanism of FIGURES 14 and 15; and FIGURE 18 is a broken vertical sectional view of a carton or package containing a plurality of rolls of the type shown in FIGURES 5 through 7.

Figure 1:
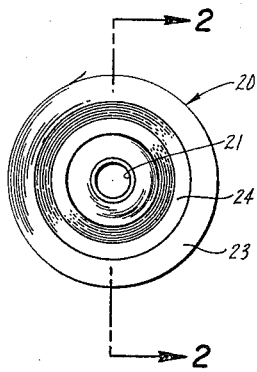
Figure 2:
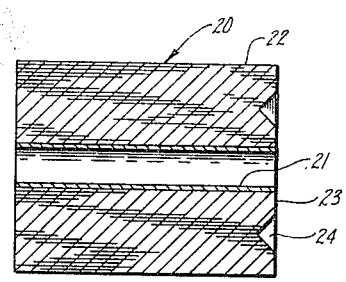

The roll illustrated in FIGURES 1 and 2 is designated generally with the numeral 20 and, in the typical case, will be a roll of paper toweling. The roll 20 comprises a tubular core 21 having a web of material wound thereabout in contiguous convolutions 22. At one end the body of material defined by the contiguous convolutions 22 is provided with an annular channel or groove that is generally V-shaped in cross section, and for purposes of identification, such end is denoted with the numeral 23 and the groove with the numeral 24. In the specific illustration, the groove 24 is disposed intermediate the inner and outer convolutions of the wrapped material and at substantially the midpoint thereof, although such centered location of the groove is not critical and may be varied in accordance with the requirements of the mating support chuck with which the roll is to be used.

Figure 3:
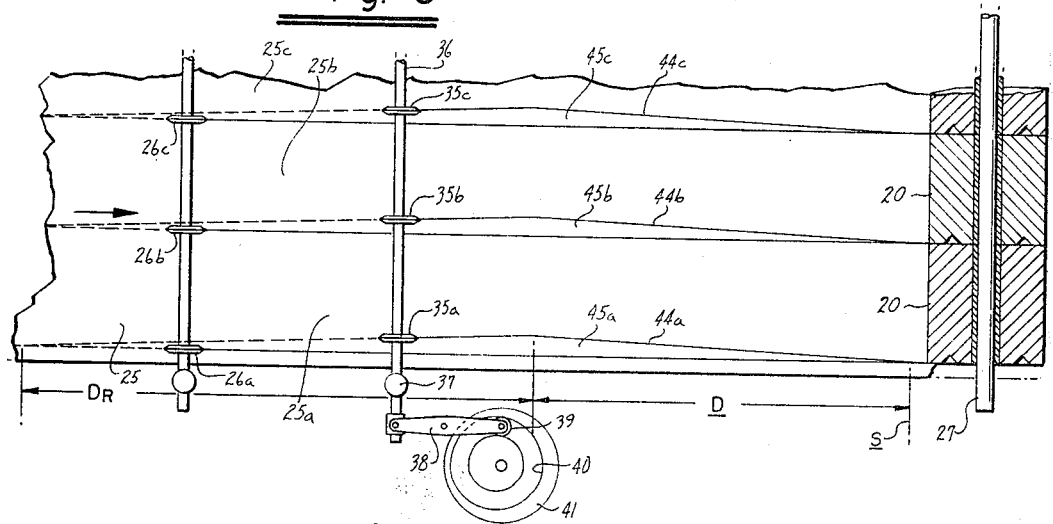

As indicated in FIGURE 3, a plurality of rolls 20 are formed simultaneously from a continuous web 25 drawn from a parent roll (not shown). As the web 25 is advanced from left to right in the direction of the arrow in FIGURE 3, it is continuously severed into a plurality of web sections 25a, 25b and 25c by fixedly oriented slitting knives 26a, 26b and 26c. The number of knives employed will depend upon whether the web 25 is trimmed along one or both of the longitudinal edges thereof, upon the width of the web, and upon the width of the web sections 25 to be formed therefrom. In a typical operation, the knives are spaced eight inches apart, and ten individual knives may be provided to sever the web 25 into nine sections and trim the web along each longitudinal edge thereof. As the sections 25 continue to be advanced, they are wound upon a core segmented into widths respectively corresponding to those of the sections 25, and each such core segment forms the core 21 of a roll 20. The segmented core is supported upon a shaft or mandrel 27 while the web sections are being wound thereon; and after a suitable number of convolutions are wound upon the core segments, the web sections are severed transversely and the individual rolls 20 are stripped from the mandrel 27.

Figure 4:
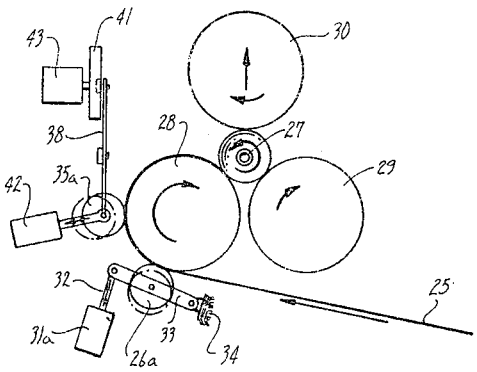

The operation so far described is conventional, and may be carried out in any of the commercially available web rewinding machines—a typical example of which is illustrated diagrammatically in FIGURE 4 and comprises a rotatable platen 28, rotatable bed roll 29 and a rotatable rider roll 30 all of which cooperate to receive a core-equipped mandrel 27 adapted to have the web sections 25 wound thereabout. The knives 26 in the machine exemplified in FIGURE 4 are of the score-type in contrast to scissors-type knives, and bear against the platen 28 so as to sever the web advancing over the cylindrical surface thereof. The knives 26 are adapted to be selectively moved into and out of engagement with the web 25 between the relative positions shown by full lines and broken lines in FIGURE 4; and such movement is accomplished by a plurality of motors respectively associated with the knives.

These motors, for example, may be air motors such as the piston-cylinder structure 31a shown in association with the knife 26a. The cylinder of this structure is fixedly located, and the piston rod 32 is pivotally connected to one end of a link 33 which at its other end is pivotally connected to a support structure 34. The cutting knife is rotatably supported by the link intermediate the ends thereof; and when the air motor is energized, the reciprocable piston urges the rod 32 outwardly which causes the link 33 to press the knife toward the platen 28 and into cutting engagement with the web 25 traversing the same.

In the method of severing the web 25 so that the groove or channel 24 is automatically formed in each of the individual rolls 20, each of the web sections 25 is severed along one longitudinal edge thereof by one of a plurality of groove-slitting knives 35a, 35b and 35c which are disposed in a ganged arrangement and are supported for translational displacements transversely of the path of travel defined by the web 25 and the various web sections formed therefrom. In the diagrammatic illustration of FIGURE 3, such groove-slitting knives 35 are rotatably supported upon a common shaft 36 that is reciprocable along the axis thereof relative to a support 37. Such reciprocable displacement is enforced on the shaft 36 by suitable motor means such as screw drivers, air cylinders, etc., and in the specific illustration is enforced by a lever 38 pivotally secured at one end to the shaft, supported at its center by a pivot pin, and equipped at its opposite end with a cam follower 39 that rides in a cam groove 40 cut in a rotatable cam or plate 41. For illustrative purposes, the cam groove 40 is eccentric relative to the axis of rotation of the cam 41, and as the cam rotates, the lever 38 is pivoted about the support therefor to reciprocate the rod 36 and knives 35 transversely with respect to the web.

As shown in FIGURE 4, the web rewinding machine as heretofore described is equipped with the additional groove-slitting knives 35, and the knives are respectively associated with a plurality of air motors 42 which are adapted to displace the knives between the slitting and retracted positions thereof respectively shown by full lines and dotted lines. As illustrated in this figure, the cam 41 is rotated by a motor 43, and energization of the motors 42 and motor 43 is substantially concurrent. Thus, when the air motors 42 are rotated to displace the knives 35 into their cutting position, the motor 43 is simultaneously energized so that translational displacement of the knives is initiated.

As shown in FIGURE 3, the knives 35 are initially in longitudinal alignment with the respectively corresponding knives 26; and when the knives 35 are first pressed into cutting engagement with the web sections 25, such sections will be oriented so that the location designed with the letter S, which signifies the starting position of the groove-slitting knives, will be longitudinally aligned therewith. Thereafter, as the web continues to advance through the distance D, the knives 35 are displaced inwardly toward the centers of the respectively associated web sections to form lines of severance 44a, 44b and 44c. After the distance D is traversed, the knives 35 are displaced in the opposite direction toward their starting position; and when the knives have returned to such position so that the terminal ends of the lines of severance 44 are coincident with the lines of severance formed by the knives 26, the air motors 42 are unloaded to retract the groove-slitting knives 35 and thereby terminate their cutting operation. Thus, the knives 35 cut an elongated triangularly-shaped strip of material from the sections 25 along one longitudinal edge thereof, and each such strip of material (denoted for identification with the numerals 45a, 45b and 45c) is discarded.

Thus, in the roll-forming method described, a continuous web is severed longitudinally into a plurality of web sections, each such section is severed in a particular pattern throughout a determinate length along one longitudinal edge thereof to remove a strip of material therefrom, and subsequently the resulting web sections are wound onto segmented cores to form a plurality of adjacent rolls which (when stripped from the supporting mandrel therefor) are each seen to have the configuration of the roll 20 shown in FIGURES 1 and 2 in which one end of the roll is provided with an annular groove adapted to receive a supporting chuck therein when the roll is mounted within a dispensing cabinet. The groove 24 may have varying configurations, and in the particular form shown in the drawings such groove is generally V-shaped in cross section. However, the angle defined by the side walls of such groove can be increased or decreased, the depth of the groove can be changed, and the shape of the groove may be readily changed (trapezoidal, for example) simply by varying the slitting configuration provided by the knives 35, and this is readily altered by changing the definition of the cam groove 40.

Figure 5:
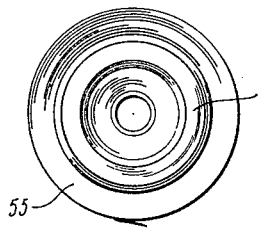
Figure 7:
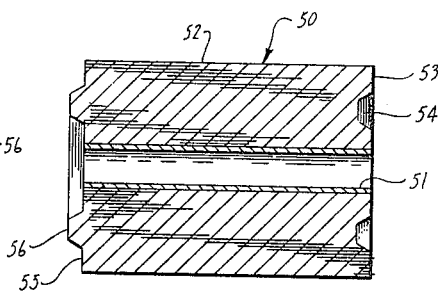
Figure 6:
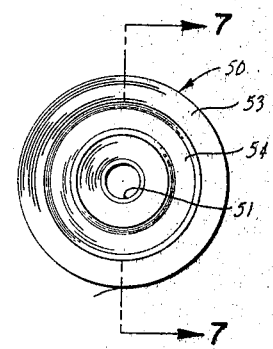

The modified roll illustrated in FIGURES 5, 6, and 7 is designated generally with the numeral 50, and comprises a tubular core 51 having a web of material wound thereabout in contiguous convolutions 52. At one end, the body of material defined by the contiguous convolutions 52 is provided with an annular channel or groove, and for purposes of identification such end is denoted with the numeral 53 and the groove with the numeral 54. In the specific illustration, the groove 54 is disposed intermediate the inner and outer convolutions of the wrapped material and at substantially the midpoint thereof, but this positioning is not essential as heretofore explained. The roll 50 at its opposite end 55 is provided with an outwardly extending annular projection or chuck 56 axially aligned with the groove 54. The groove and chuck have the same cross sectional configuration (which, in the specific form shown, is generally trapezoidal) and, as will become apparent hereinafter, the material removed from one web section to form the groove 54 in a roll 50 provides the material forming the chuck 56 in an adjacent roll.

Figure 8:
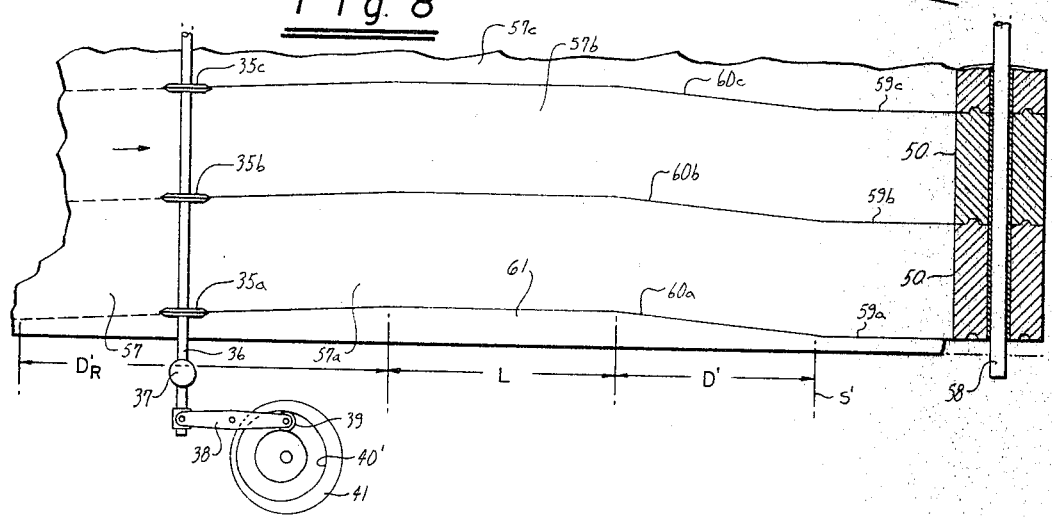

As indicated in FIGURE 8, a plurality of rolls 50 are formed simultaneously from a continuous web 57 drawn from a parent roll (not shown). As the web 57 is advanced from left to right in the direction of the arrow in FIGURE 8, it is continuously severed into a plurality of web sections 57a, 57b and 57c by a plurality of slitting knives. As stated hereinbefore, the number of knives employed will depend upon the width of the web and the width of the web sections, but in forming the rolls 50 the web ordinarily will be trimmed along each of the longitudinal edges thereof. As the web sections are advanced past the slitting knives, they are wound upon a core segmented into widths respectively corresponding to those of the web sections 57, and each such core segment forms the core 51 of a roll 50. The segmented core is supported upon a shaft or mandrel 58 while the web sections are being wound thereon; and after a suitable number of convolutions are wound upon the core segments, the web sections are severed transversely and the individual rolls 50 are stripped from the mandrel 58.

Figure 9:
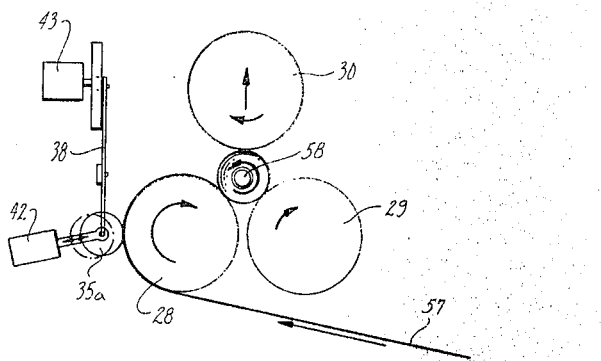

With respect to the foregoing description of a web slitting and rewinding operation, the substantially conventional apparatus illustrated in FIGURE 4 may be employed except that all of the knives 26 are maintained in the retracted position thereof, and in that they perform no function have been removed in the illustrations of FIGURES 8 and 9. Therefore, the apparatus illustrated diagrammatically in FIGURE 9 comprises the aforementioned rotatable elements (platen 28, bed roll 29 and the rider roll 30) which are oriented to cooperatively receive the core-equipped mandrel 58 which is adapted to have the web sections 57 wrapped thereabout.

In the method of severing the web 57 so that a groove 54 and chuck 56 are automatically formed in each of the individual rolls 50, the web sections 57a, 57b and 57c are severed along each longitudinal edge thereof by the aforementioned knives which perform both the web-slitting and groove-slitting operations. Such knives are structurally the same as the knives 35 heretofore described, but their operational sequence is varied. Therefore, the same numerals are used to identify the knives and associated components in the two embodiments. However, the cam groove has a slightly different configuration in that the roll groove 54 and chuck 56 are of trapezoidal configuration rather than triangular, and for this reason the cam groove is denoted with the numeral 40'.

The knives 35 are initially loaded by the air motors 42 and are pressed into cutting engagement with the web 57, but the motor 43 is in a deenergized condition so that the cam 41 is stationary. Therefore, the knives 35 sever the web 57 into a plurality of web sections, and such lines of severance are denoted with the numerals 59a, 59b and 59c. At a predetermined location along the web sections (such point therealong being designated with the letter S'), the motor 43 is energized to initiate rotation of the cam 41. Thereafter, as the web continues to advance longitudinally through a distance D', the knives 35 are displaced inwardly toward the centers of the respectively associated web sections to form the inclined lines of severance 60a, 60b and 60c. After the distance D' is traversed, the motor 43 is deenergized to terminate rotation of the cam 41, and this deenergized condition is maintained until a length L along the web sections traverses the knives. Then the motor 43 is again energized and the knives 35 are displaced in the opposite transverse direction toward their starting position; and when the knives have returned to such starting position, the motor 43 is deenergized so that the web 57 continues to be severed along lines corresponding to the initial lines of severance 59. In this embodiment of the invention, there is no waste material between adjacent web sections as in the case of the prior embodiment, and the only lost material consists of the trim strips along the outer longitudinal edges of the web 57—one such strip being shown and for identification being denoted with the numeral 61.

A conventional semi-automatic web rewinding apparatus modified to include the groove-slitting knives 35 is illustrated in FIGURES 10 and 11, and such web rewinding apparatus includes a frame having end plates—one of which is shown in FIGURE 10 and is designated with the numeral 65. Extending between such plates and rigidly secured thereto is a large shaft 66 having mounted thereon in spaced apart relation a pair of support blocks 67 and 68. The blocks may be fixedly secured to the shaft by any suitable means, as for example by welding, or each of the blocks may be segmented and clamped to the shaft by bolts, as shown, so as to permit the blocks to be selectively located in an angular sense relative to the shaft. Also secured to the end plates and extending therebetween is a platform structure 69 comprising a cover or tabletop 70 and a plurality of structural elements to rigidify, relate, and secure the tabletop to the end plates.

The end plates extend upwardly and rearwardly to provide a mounting for the platen, bed roll and rider roll, as well as for a shear roll, if a separate shear roll is used to cut the web into predetermined lengths corresponding to the length of the web sections wound upon the cores to form the rolls 20 and 50—the shear frequently being provided by one of the aforementioned rolls and being normally retracted thereinto. In FIGURE 10, the platen 28 and rider roll 30 are shown—the latter of which is equipped with a shaft or axle 71 suitably journalled at each end in bearings 72 a portion of which extends into and is vertically slidable within slots 73 provided therefor in the end plates. The rider roll 30 is biased downwardly by gravitational forces toward the position thereof shown in FIGURE 10, but is progressively displaced upwardly as web convolutions are wound about a core-equipped mandrel disposed beneath the rider roll 30 in cooperative engagement with the platen 28 and bed roll 29. Both the platen and bed roll are rotatably journalled in appropriate bearings carried by the end plates of the apparatus, and are rotatably driven by a motor (not shown) through a drive belt 74 entrained about sprockets respectively carried by the shaft or axle of the rolls, such as the sprocket 75 shown in association with the platen 28.

Such web rewinding apparatus, as heretofore stated, is equipped with a plurality of slitting knives 26; and as shown in FIGURE 10 in association with the slitting knife 26a, each such knife is rotatably supported between a pair of links or levers 33 that are pivotally related at one of their ends by a support structure 34. The slitting knives 26 are ordinarily adjustable in a transverse direction so as to selectively vary the center-to-center spacing therebetween and, as is well known, the supports 34 may be releasably clamped for such purpose to a transversely extending wedge plate 76.

In the specific structure illustrated, the clamping members 77 and 78 which are adapted to be secured to each other are clamped into tight frictional engagement with the plate 76 by a plurality of bolts 79. The clamping element 77 is welded or otherwise rigidly secured to a bracket 80 that, in turn, is secured to a support plate 81 rigidly connected to a base plate 82 welded or otherwise fixedly related to the support block 67. A second such support plate 83 is provided adjacent the opposite end of the machine, and it is similarly secured to a base plate 84 that is rigidly related to the support block 68. Angularly disposed braces 85 and 86 are respectively associated with the elements 81–82 and 83–84 to rigidify the interconnections thereof.

The links 33 which are respectively associated with the knives 26 are pivotally connected at their outer ends to the rods 32 of the pistons which respectively comprise a part of the various piston-cylinder motor means, such as the motor means 31a shown in FIGURE 10. The cylinder of each motor means is secured to and carried by the structure 34, and each such motor means is connected to a manifold (not shown) through a tube or conduit 87—the suffixes a, b, and c being used to differentiate between the various conduits illustrated in FIGURE 11. Thus, as heretofore described, when the motor means 31 are energized, the cutting knives 26 are swingably displaced into cooperative slitting engagement with the platen 28; and when the motor means are deenergized, the cutting knives are retracted from such cooperative slitting relation. Piston-cylinder motor means operative in this manner are conventional, and usually each piston and its rod 32 are spring biased internally toward the retracted position thereof.

The slitting knives 35 and their associated control and mounting structures are commercially available units; and they function in a manner generally similar to the knives 26 and the mechanism associated therewith. As is most evident in FIGURE 11, each of the knives 35 is rotatably supported between the spaced legs 90 and 91 of a bracket that is movably carried by a mounting member 93 fastened by bolts (as illustrated in FIGURE 10) or otherwise anchored to a knife holder 94. Each of the cylinders 42 is connected by a tube or conduit 95 to a manifold 96 supplied with compressed air from a source (not shown); and when each such cylinder is energized, the piston and rod 97 thereof (the latter being secured by a pin 92 to an associated knife bracket) is displaced outwardly relative to its cylinder and, as a consequence, the legs 90 and 91 are displaced toward the platen 28 to move the associated knife 35 into cutting engagement therewith. When the cylinders 42 are deenergized, the knives are retracted to remove the same from cutting association with the platen. The respective piston-cylinder structures 42 and conduits 95 have letter suffixes added thereto for the purpose of respectively correlating the same with the corresponding knives 35.

A knife holder 104 is transversely reciprocable to simultaneously displace all of the knives 35 carried thereby, and, for this purpose, the knife holder is secured in position on a slide plate 94 supported upon bearings 98 and 99, which are secured in position on a carrier or bed 100. Two carriers 100 are provided—one adjacent each end of the apparatus, and such carriers are respectively secured to the support plates 81 and 83. This interconnection of each carrier and support plate is rigidified by a brace 101 which, then, serves substantially the same function as that of the brace 102 reinforcing the interconnection of the plate 77 and bracket 80.

Secured to the slide plate 94 by cap screws or other suitable means are spacer elements 103 and the knife holder 104, and each, in turn, is fixedly related to the base 105 of an L-shaped channel or bracket having an upwardly extending web 106. The manifold 96 is carried by the web 106, and the base 105 of the channel is recessed to receive therein and be secured to the connection post or pin 107 of a pushrod or actuator 108 that is preferably pivotally connected to the pin by a joint 109 that permits articulation of the actuator rod relative to the pin in the event that the assembly carried by the support blocks 67 and 68 is swung in a counterclockwise direction (as viewed in FIGURE 10) relative to the axis of the support shaft 66. With this arrangement, reciprocation of the actuator rod 108 along the axis thereof is effective to transversely displace the L-shaped channel comprising the base 105 and web 106, the elements 103 and 94, the knife holder 104 and the slitting knife assemblies carried thereby, including the various pistons 42 and the manifold 96.

The actuating mechanism for cyclically displacing the various groove-slitting knives 35 by reciprocable displacement of the actuator rod 108 is illustrated in FIGURES 12 and 13, and will now be described. Such mechanism comprises frame structure designated generally with the numeral 110, and supported thereby is a variable-speed gear reducer 111 having an input shaft equipped with an input gear 112 driven by a belt 113 entrained about a drive sprocket 114 secured to the shaft or axle of the platen 28. Consequently, when the platen 28 is rotatably driven, as heretofore described, the gear reducer 111 is energized and the output shaft 115 thereof is rotated, as is the output gear 116 mounted thereon. The output speed of the shaft 115 is selectively adjustable, and adjustment thereof is accomplished by a hand crank 117. The gear reducer is a conventional assembly, and adjustably selecting the output speed thereof determines the length, along each web section, of the slit effected by the knives 35 and, in turn, this determines the width (not the depth) of the groove 24 in the roll 20.

An endless chain 118 is entrained about both the output gear 116 of the speed reducer and a sprocket 119 formed integrally with or otherwise rigidly equipped with a hub 120 rotatably mounted upon a shaft 121 which is journalled for rotation at its opposite ends in bearing structures 122 and 123 (which are adapted to be lubricated, as shown). The chain 118 also passes over a take-up sprocket 124, the position of which may be adjusted by a screw 125 to suitably determine the tension of the drive chain 118. Also secured to the hub 120 is an input component or plate 126 of a one-revolution clutch having an output component or plate 127 formed integrally with or otherwise equipped with a hub 128 mounted upon the shaft 121 for rotational movement with respect thereto. The facing surfaces 129 and 130 respectively provided by the clutch plates 126 and 127 are provided with radially oriented ridges or teeth, as shown in FIGURE 13, that are adapted to matingly engage when the faces are in contiguous relation whereupon the clutch plate 127 is then positively driven by the plate 126.

The clutch plate 127 and hub 128 thereof are axially slidable along the shaft 121 and are biased toward the left (as viewed in FIGURE 13), to urge the clutch plate 127 into mating engagement with the clutch plate 126, by a helical spring 131 circumjacent a portion of the shaft 121. The spring seats at one end against the terminal end of a recess provided therefor in the hub 128, and at its other end against the terminus of a recess provided in the hub 132 of a cam 133 having a cam groove 134 formed in a face thereof. A driving connection is continuously defined between the clutch hub 128 and cam hub 132 by a tongue and slot connection which, however, permits relative axial movement between these two elements along the shaft 121. The cam hub and cam component (132–133) are pinned to the shaft 121 by a set screw 135 so that such component is constrained against axial movements along the shaft; and the tongue and slot arrangement is defined by a diametrically oriented tongue 136 carried by the clutch hub 128 and a mating slot 137 provided by the cam hub.

The clutch hub 128 has a timing groove or cam groove 138 formed along the outer surface thereof, and such groove is coaxially circumjacent the shaft 121. This timing groove has an interruption formed therealong defining a terminal end 139, adjacent which one side of the groove tapers inwardly as shown at 140. A follower 141 rides in such groove; and because the follower cannot be displaced along the axis of the shaft 121, the clutch hub 128 and plate 127 thereof are forcibly displaced or are cammed toward the right (as viewed in FIGURE 13) against the biasing force of the spring 131 to disengage the faces 129 and 130 of the clutch when the follower 141 traverses the curved surface portion 140 of the timing groove 138.

Referring to FIGURE 12 in particular, it is seen that the cam follower 141 is secured by a pin 142 to an arm 143 that is resiliently biased by a helical spring 144 toward the right (as view in this figure) about a pivotal support therefor formed by a bifurcated bracket 145 to urge the cam follower 141 into the timing groove or cam groove 138. However, the follower 141 may be displaced outwardly from such groove to release it from the terminal end 139 thereof by a solenoid 146 having a plunger connected with the arm 143 so as to displace the same toward the left against the force of the spring 144.

Upon such extraction of the follower 141 from the timing groove 138, the spring 131 forces the clutch plate 127 and hub 128 axially along the shaft 121 to bring the faces 129 and 130 of the clutch plates into driving engagement— in which event, the cam 133 is rotated through the driving train comprising the gear 114 on the platen shaft, belt 113, input gear 112 of the speed reducer 111, output gear 116 of the reducer, link chain 118, sprocket 119, hub 120 and clutch plate 126, clutch plate 127 and hub 128, and the hub 132 which is connected with the cam 133. This connection is initiated when the solenoid 146 is energized to withdraw the follower 141 from the timing groove 138, and exists for approximately one complete revolution of the clutch plate 127 and its hub 128 because the solenoid 146 is only momentarily energized, and immediately after it is deenergized, the follower 141 returns to its prior position within the timing groove 138 and is effective to displace the cam plate 127 and hub 128 from engagement with the clutch plate 126 and to terminate rotation of the clutch plate 127 as it approaches and finally abuts the terminal end 139 of the timing groove.

The cam 133 has a depression 147 formed along the peripheral surface thereof, and riding on such surface is a roller or cam follower 148 carried by an arm 149 forming a part of the actuating mechanism for a switch 150. The arm 149 is biased by a spring 151 in a direction urging the follower 148 into tight abutment with the peripheral surface of the cam 133, and such arrangement provides a dual function. First, when the cam 133 commences to rotate following actuation of the solenoid 146, the switch 150 is closed because the follower 148 on the arm thereof rides upwardly and out of the depression or recess 147. The switch 150 controls a solenoid-actuated valve 152 (FIGURE 10) that controls the supply of compressed air to the slitter manifold 96; and when the switch 150 is closed, the solenoid valve 152 is opened to permit compressed air to be supplied to the manifold 96. When the switch 150 is deenergized by movement of the follower 148 into the recess 147 of the cam, the solenoid valve 152 is closed so as to exhaust the manifold 96 and permit the slitting knives 35 to be retracted.

The second function performed by this follower-cam arrangement is that the spring 151, through the bell crank or arm 149, causes the cam follower 148 to rotate the cam 133 through a slight angular distance equivalent essentially to an arcuate length along the surface of the cam corresponding to the slope distance leading from such surface to the lowermost point in the recess 147. This small rotational movement is enforced on the cam at the moment that the clutch faces 126 and 127 are disengaging, and it is effective to completely disengage such faces and thereby prevent chattering or intermittent engagement of the radial teeth thereof which might otherwise occur.

The main cam groove 134 in the face of the cam 133 has a cam follower 153 riding therein, and such cam follower is carried by an arm 154 pivotally mounted intermediate the ends thereof in a bracket 155. The arm 154 at its upper end is connected through a joint 156 to the actuator rod 108; and when the cam 133 is rotated, the follower 153 in riding in the cam groove 134 causes the arm to rotate about its pivotal axis in accordance with the configuration of such cam to reciprocate the rod 108 along its axis and thereby reciprocate the groove-slitting knives 35 transversely with respect to the web 25. As stated heretofore, actuation of the cam 133 is controlled by the solenoid 146, and energization thereof is determined by a switch 157 having an arm adapted to be displaced by an adjustably located finger or trigger element 158a associated with the rider roll 30 so as to be moved therewith as the rider roll progressively travels upwardly in accordance with each additional web convolution being wound about a core-equipped mandrel supporting the rider roll thereon. The finger 158a may be carried by the bearing block 72 exteriorly of the side plate 65 of the main frame, and the switch 157 may be similarly mounted on such side plate. A second adjustably located finger or trigger element 158b is also carried by the bearing block 72, but is sufficiently remote from the switch arm so as not to engage the same. Its use will be explained hereinafter in connection with the modification shown in FIGURES 14–17.

It should be appreciated that various arrangements may be employed to time the cyclic actuation of the groove-slitting knives 35 and cam 133 in a manner such that the roll grooves 24 may be located along the end 23 of the rolls 20 at any desired position. For example, in some instances, the groove 24 should start adjacent the core 21 rather than at the location shown in FIGURES 1 and 2; and in still other instances, the groove may have some other radial location. In any event, the location of the inner edge of the groove is determined by the initial actuation of the groove-slitting knives 35; and with the specific timing apparatus illustrated, the initiation of such actuation is determined by the position of the switch 157 with respect to the finger or trigger element 158a. More specifically, if the trigger element is moved downwardly, the groove 24 will commence at a location more remote from the core 21; and vice versa.

The slope of the side walls of the groove 24 is determined by the rate of rotation of the cam 133—which is readily altered by appropriate adjustment of the control 117 of the gear reducer 111. In the structure shown, the depth and cross sectional configuration of the groove 24 are determined by the cam 133 and cam groove 134 thereof, and cannot be altered except by changing the cam. The precise configuration of the cam will depend upon the depth desired for the groove 24, the thickness of the web 25, and the cross sectional contour of the groove 24; and such factors will be considered in further detail in connection with the embodiment of the invention illustrated in FIGURES 14 through 17.

A cam groove configuration and velocity of rotation might be selected for the cam 133 so that the roll groove and roll chuck arrangement shown in FIGURES 5 through 7 in connection with the roll 50 can be provided—in which event, the slitting knives 26 (which are loaded when the main switch of the web rewinding apparatus is closed) would be permanently deenergized—i.e., retracted. However, the modified apparatus illustrated particularly in FIGURES 14 and 15 has been found more suitable in forming groove-and-chuck-equipped rolls, especially where such rolls 50 have relatively large diameters.

Figure 15:
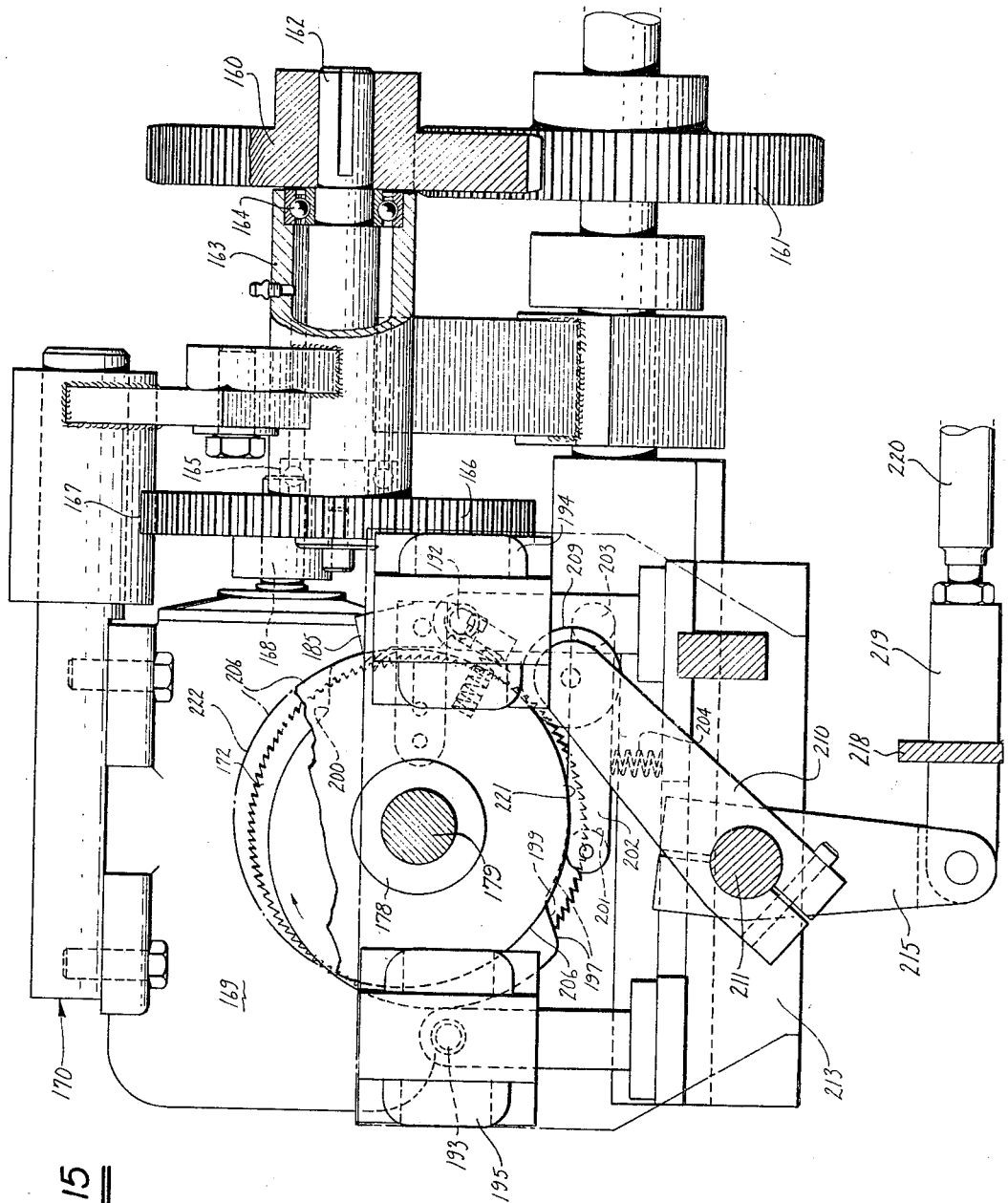
FIGURE 15 is a vertical sectional view taken generally along the line 15—15 of FIGURE 14.

This modified actuator mechanism includes an input gear 160 driven by the web rewinding apparatus, either as heretofore described or by means of a gear train comprising the illustrated gear 161. The gear 160 is keyed or otherwise secured to a shaft 162 so as to enforce rotation thereon, and the shaft 162 extends through a tube 163 which rotatably supports the shaft therein on spaced bearings 164 and 165. Bolted to the shaft 162 at the inner end thereof, or otherwise secured thereto so as to rotate therewith, is a change gear 166 that meshes with an input gear 167 mounted upon the input shaft 168 of a gear reducer 169, which may be of the variable-speed type as heretofore described. The gear reducer is bolted to a frame structure designated generally with the numeral 170, and the hollow tube 163 is similarly bolted to such frame structure through intermediate support elements, as shown in FIGURE 15.

Mounted upon the output shaft 171 of the gear reducer 169 is a ratchet gear 172 which may be keyed to the shaft (as shown in FIGURE 14) so as to prevent relative rotation therebetween. The ratchet gear 172 terminates short of the end of the shaft 171, and mounted upon such end of the shaft is bearing structure 173 held on the shaft and clamped against the ratchet gear by a bolt and washer composition 174. Rotatably supported by the bearing structure 173 is an axially extending hub 175 having a stepped configuration defining three axially distinct steps 176, 177 and 178 that successively decrease in diameter. The hub is also circumjacent a shaft 179 journalled for rotation in bearing structure 180 carried by the frame 170. The hub 175 is freely rotatable with respect to both the output shaft 171 of the speed reducer and the ratchet gear 172 mounted thereon, except when the hub and ratchet gear are selectively interconnected by releasable drive mechanism.

As seen most clearly in FIGURE 16, such releasable drive mechanism comprises a support arm 181 that is received within a slot 182 provided therefor in the stepped portion 176 of the hub 175. The arm 181 is secured to the hub within such slot by a pair of cap screws 183. Pivotally secured to the arm 181 exteriorly of the stepped portion 176 of the hub by a pivot pin 184 is a pawl 185 having a notched or tooth-equipped head 186 adapted to engage the teeth of the ratchet gear 172. As is evident in FIGURE 14, the pawl 185 is disposed along one face of the support arm 181 and extends over the ratchet gear 172 so as to be able to engage the same; and the pawl is resiliently urged into engagement with the teeth of the ratchet gear 172 by a helical spring 187 which at one end seats within a recess 188 provided in the stepped portion 176 of the hub 175, and which at its other end bears against and seats within a recess provided therefor in a plate 189 carried by the pawl at the end 190 thereof. The plate 189 extends outwardly from the end portion 190 of the pawl in the direction of the hub, but the spring 187 may be inclined or angled slightly so as to minimize the extension of the plate.

The plate 189 has a cam surface 191 at the leading edge thereof adapted to successively and alternately engage one and then the other of a pair of stops 192 and 193 that are located so as to ride along the cam surface 191 and thereby force the pawl 185 to rotate in a clockwise direction, as viewed in FIGURE 16, to withdraw the tooth-equipped end 186 thereof from meshing engagement with the ratchet gear 172. The stops 192 and 193 are located substantially 180° apart; and quite evidently, when one or the other is engaged by the plate 189 to release the pawl 185 from the ratchet gear, rotation of the hub 175 is terminated.

The stops 192 and 193 are supported for axial displacements along the lengths thereof, and respectively associated therewith are solenoids 194 and 195. When the solenoids are energized (the function remains the same whether they are energized simultaneously or alternately), the stop rods 192 and 193 associated therewith are displaced toward the right (as viewed in FIGURE 14) to withdraw the same from engagement with the plate 191 to permit the pawl 185 to reengage the ratchet gear 172, which then initiates rotation of the hub 175. It is evident that the hub 175 is first rotated through approximately 180°, its rotation then terminated, and its rotation thereafter reinitiated to permit it to rotate through the succeeding angular distance of approximately 180°, at which point its rotation is again terminated. One complete rotation of 360° is accomplished for each winding of an entire roll 50, and subsequent initiation commences another web rewinding cycle. The stop rods are resiliently biased into their extended position by springs, such as the spring 196 shown in FIGURE 14 in association with the rod 192. (As between FIGURES 15 and 14, the ratchet gear 172, pawl 185, etc. have been rotated approximately 90° for illustrative advantage.)

Mounted upon the stepped portion 177 of the hub 175 is a cam 197 which may be secured thereto by an suitable means so as to prevent relative rotation therebetween as, for example, by means of a plurality of cap screws 198, as shown in FIGURE 14. The cam 197 has an outer surface provided with two relatively steep rises or cam surfaces 199 and 200 disposed approximately 180° apart. Adapted to ride along such outer surface of the cam is a follower 201 carried by an arm 202 pivotally supported at the end 203 thereof; and the arm 202 is resiliently biased by a spring 204 in a direction that urges the follower 201 into firm engagement with the outer surface of the cam 197. The function of the cam 197 and follower 201 is to cause the hub 175 to continue its rotation through a relatively short angular distance after the pawl 185 has been disengaged from the ratchet gear 172 so as to prevent intermittent reengagement therebetween and chattering. This undesirable occurrence is avoided since disengagement of the pawl takes place at about the moment that the follower 201 starts to ride downwardly along one or the other of the inclines 199 or 200; and as a consequence thereof, and because of the force exerted by the spring 204, the cam 197 and hub 175 are cammed or rotated forwardly (in the direction of the arrow in FIGURE 15), which has the effect of causing the plate 191 carried by the pawl to move an additional angular distance relative to either of the stop pins 192 or 193, with the result that the pawl 185 is pivoted outwardly an additional increment against the biasing force of the spring 187 to place the tooth-equipped head 186 more remote from the surface of the ratchet gear 172.

Secured to the hub 175 in circumjacent relation with the stepped portion 178 thereof are a pair of slitter-actuating cams 205 and 206—one of which is functionally controlling at any one time and the other dormant (which controls and which is dormant) is manually determined. The cam 205 is fixedly but removably secured to the hub 175 by a plurality of pins or set screws 207. The cam 206 in turn is secured by one or more bolts or fasteners 208 to the cam 205, and such bolts 208 may be released to rotate the cam 206 relative to the cam 205 between two selective positions of adjustment. In one position of the cam 206 relative to the cam 205, the latter (cam 205) controls the displacement of the slitting knives; and in the alternate position of the cam 206, it controls the function of the slitting knives.

Riding in engagement with the outer cam surface of either of the cams 205 or 206 (whichever is controlling) is a cam follower 209 that is rotatably carried between the spaced legs of a bifurcated arm 210 clamped to a shaft 211 journalled for rotation in bearings 212 and 213 provided by the frame structure 170. Also clamped to the shaft 211 are a pair of actuator arms 214 and 215 that are pivotally connected, respectively, to a pair of links 216 and 217 welded to or otherwise rigid with a mounting plate 218 that is fastened by a connector 219 to a pushrod or actuator rod 220 which, for example, may be the same as the rod 108 heretofore described, assuming the web rewinding apparatus is the same. Clearly, as the follower 209 rides along the cam surface of either the cam 205 or 206, the arm 210 causes the shaft 211 to pivot whereby the arms 214 and 215 are cyclically displaced, and the actuator rod 220 is reciprocated to displace the web-slitting knives transversely of the web 57 (FIGURES 8 and 9).

The general configuration of a typical cam 205 or 206 is illustrated in FIGURE 17, and this figure graphically illustrates that the high and low points of the slitter-actuating cam are not diametrically oriented—that is to say, they are not spaced from each other by 180°. The reason for this has to do with the progressively increasing diameter of the roll 50 (and the roll 20) as successive convolutions are wound about the core-equipped mandrel 58. More particularly, as the roll of toweling increases in diameter, the circumference thereof accordingly increases. Consequently, a much longer strip of webbing is required to form the convolution at the outer extremity of the groove 54 than at the inner extremity thereof. Quite evidently then, if the slope and slope length of the inner and outer walls of the groove 54 and of the chuck 56, as viewed in cross section (see FIGURE 7), are to be substantially the same, the slitting knives 35 on the return leg of their reciprocatory movement must sever a greater length of webbing than on the initial leg of such movement.

Accordingly, in FIGURE 3 it may be noted that the distance $D_R$, which is representative of the return leg of the reciprocatory displacement of the knives 35, is substantially greater than the distance D which is representative of the initial leg of such displacement. Similarly, in the embodiment illustrated in FIGURE 8, the distance $D'_R$ which corresponds to the return displacement of the cutting knives 35 is of greater length than the distance D' which represents the initial displacement of such knives.

Thus, relating the cam configuration as illustrated in FIGURE 17 to the various dimensions and locations identified in FIGURE 8, the low point 221 of the cam corresponds to the location S', and the arcuate distance between the low point 221 and the high point 222 of the cam, which is approximately 160°, corresponds to the distance D'. The return angle of 200° from the high point 222 to the low point 221 of the cam corresponds to the distance $D'_R$—rotation of the cam being in the direction of the arrow in FIGURE 17. The depth of the groove 54 is fixedly determined by the low and high points 221 and 222 of the cam; the radial extent of the inner flat wall of the groove is determined by the length of time the cam is held in a stationary condition following its initial rotation through 160° (the time the cam remains stationary determining the distance L in FIGURE 8); and the slope of the inner and outer walls of the groove 54 being dependent upon the velocity of rotation of the cam, which is selectively changeable by adjustment of the variable-speed gear reducer 169. The two cams 205 and 206 are provided in the apparatus so that it can be quickly converted from one size or shape of groove to another simply by rotating the cam 206 relative to the cam 205 to selectively make one or the other control the displacement function (it being understood that the shape of the two cams will differ suitably). Clearly, cams of various contour may be interchanged with the cams 205 and 206 illustrated in FIGURE 14 whenever this is desired for the purpose of changing one or more of the groove and chuck characteristics, or in accordance with any extreme changes in web thickness.

In the actuator mechanism embodiment illustrated in FIGURES 12 and 13, the single switch 157 and single trigger element 158a therefor are sufficient to initiate operation of the groove-slitting knives and associated control structures, because such groove-slitting operation is thereafter continuous until completed, and further because such web rewinding apparatus is intended to be semi-automatic in operation. Therefore, once a workman has placed a core-equipped mandrel 27 in proper web rewinding position (as shown in FIGURE 4) and has actuated the apparatus, the cutting knives 26 are urged into engagement with the web 25 and the various rolls 28, 29 and 30 are rotated. Consequently, no change is made in the operating condition of the apparatus until the switch 157 is tripped which initiates rotation of the one-revolution clutch, as heretofore explained; and the clutch is then effective to actuate the knives 35 and cause reciprocation thereof through a complete cycle, and to thereafter deenergize the same. The web rewinding operation continues until terminated in the usual manner in web rewinding apparatus of this type, and a workman then removes the roll-equipped mandrel and replaces it in preparation for another cycle of operation.

However, in the actuator mechanism disclosed in FIGURES 14 and 15, the cyclic displacement of the groove-slitting knives 35 has distinct phases of operation; and although the knives are continuously maintained in severing engagement with the web 57 (see FIGURE 9), the initial leg of their transverse displacement must be timely initiated by withdrawing the stop pin 192 from engagement with the plate 189. Subsequent thereto, and after the actuator mechanism has been deenergized throughout the period that the knives 35 traverse the distance L, the mechanism must be timely actuated by withdrawal of the stop pin 193 to enable the cutting knives 35 to traverse the return leg of their transverse reciprocation. The means selected to control this cyclic function may be varied in accordance with the characteristics of any particular automatic web rewinding machine to be used—a typical machine of this type being the multiple-station turret rewinder sold by the Paper Converting Machine Company of Green Bay, Wisconsin.

To exemplify such control means, the switch 157 shown in FIGURE 10 may be used to simultaneously energize both of the solenoids 194 and 195 (it being understood that the manifold 96 will be continuously supplied with fluid under pressure when the apparatus is energized as, for example, by placing the solenoid-controlled valve 152 in operation through an appropriate circuit connection whenever the apparatus is turned on). Thus, in a cycle of operation, and considering the rewinding apparatus illustrated in FIGURES 10 and 11 (the cutting knives 26 being permanently deenergized as heretofore explained), the groove-slitting knives 35 are actuated whenever the apparatus is energized; and thereafter the knives will effect the various lines of severance 59 until a sufficient number of web convolutions are wound about the core-equipped mandrel 58, at which time the switch 157 will be actuated by the trigger element 158a to withdraw the stop 192 (and 193) and thereby permit the cam 205 (or 206) to rotate through the first 160° between the low and high points therealong.

Such rotation of the cam will be terminated by engagement of the plate 189 with the stop 193, and the resulting condition of the apparatus will be maintained until an additional sufficient number of convolutions are wound about the core-equipped mandrel to cause the switch 157 to again be actuated by the trigger element 158b. Then, the solenoid 195 withdraws the stop 193 from engagement with the plate 189 which permits the cam to rotate through its remaining 200°; and such rotation thereof is thereafter and again terminated by engagement of the plate 189 with the stop 192. The core-equipped mandrel having the web wound thereabout is subsequently removed from the winding station in any suitable and conventional manner after the requisite additional number of convolutions are wound about the mandrel.

As shown in FIGURES 3 and 8, a plurality of individual rolls are wound in contiguous relation along the mandrels; and in the usual case, the mandrel will be equipped with a tubular core although in certain instances the core may be omitted since, while convenient, it is not essential in the support of the rolls within a cabinet or dispenser therefor—particularly with the roll 50 shown in FIGURES 5 through 7 in that the groove 54 and chuck 56 thereof are used to support the roll in such dispenser. In either event, however, the adjacent rolls 50 are interconnected or physically interrelated in that the chuck 56 of one roll nests within the groove 54 in the roll adjacent thereto and, in part, is formed from the material which has been removed to define such adjacent groove 54. The interlocked or interconnected condition of the rolls 50 facilitates handling thereof especially in packaging such rolls for shipment, storage, etc.

For example, and as shown in FIGURE 18, the rolls 50 may be stacked within a shipping container or carton 224 in a plurality of tiers, with the rolls comprising each tier being held in position by the connection thereof with the rolls comprising the tiers adjacent thereto. In the package shown in FIGURE 18, the various rolls 50 comprising the lowermost tier are oriented so that the end 53 having the groove 54 therein is disposed along and is supported by the bottom wall of the carton. Each such lowermost roll has the chuck 56 thereof nested within the groove 54 of the associated roll in the tier thereabove, and so forth. Thus, with the exception of the lowermost and uppermost tiers in any particular carton, the various rolls are interconnected with the rolls thereabove and therebelow. In view of this interconnection, and consequent forced alignment of the rolls, they all tend to be maintained in proper position within the carton without the use of dividers and tier separators, and the support area defined by each roll for the roll thereabove tends to constitute the entire surface area of the roll ends. The trapezoidal configuration of the grooves 54 and chucks 56 is advantageous especially in connection with packaging and shipment of the rolls because the protruding chuck does not have a sharp end portion which would be more subject to deformation or other damage than the flattened configuration shown in FIGURE 7.

While in the foregoing specification embodiments of the invention both as to apparatus and method have been set forth in considerable detail for purposes of making a complete disclosure thereof, it will be apparent to those skilled in the art that numerous changes may be made in such details without departing from the spirit and principles of the invention.

I claim:

1. In apparatus for making a spirally wound roll of paper toweling or the like having an integral support element at one end thereof, means for advancing along a predetermined path a web of material from which such roll is wound, a knife disposed along such path for engagement with such web to cut the same longitudinally during the advancement thereof and being supported for reciprocable displacements transversely of the web, actuating mechanism for reciprocably displacing said knife transversely of such web during the advancement thereof, control means for energizing said actuating mechanism in timed relation with the advancement of such web to effect at predetermined locations therealong displacement of said knife first in one transverse direction with respect to the web and thereafter in the opposite direction with respect thereto to cut the same in a predetermined pattern along a longitudinal edge portion thereof, and means for winding the thusly cut web in spiral convolutions to form such roll whereby said support element is integrally defined in said roll by the spirally wound web forming the same, said control means including means responsive to the radial dimension of the roll being wound in such spiral convolutions for energizing said actuating mechanism.

2. In apparatus for making a plurality of spirally wound rolls of paper toweling or the like each having an integral support element at one end thereof, means for advancing along a predetermined path a relatively wide web of material from which such rolls are formed, means for severing said web longitudinally into sections respectively corresponding to the width of said rolls and including a plurality of transversely spaced knives disposed along such path for engagement with such web to respectively cut the same along section-defining edges thereof and being supported for reciprocable displacements transversely of the web, actuating mechanism for reciprocably displacing said knives transversely of said web during the advancement thereof, control means for energizing said actuating mechanism in timed relation with the advancement of such web to effect at predetermined locations therealong displacement of said knives first in one transverse direction with respect to said web and thereafter in the opposite transverse direction with respect thereto to cut the same in a predetermined pattern along such section-defining edges, and means for winding the sectioned web in spiral convolutions to form such rolls, whereby said support elements are integrally defined in the respective rolls by the spirally wound web sections forming the same, said control means including means responsive to the radial dimension of the rolls being wound in such spiral convolutions for energizing said actuating mechanism.

3. In apparatus for making a plurality of spirally wound rolls of paper toweling or the like each having an integral support element at one end thereof, means for advancing along a predetermined path a relatively wide web from which such rolls are formed, a plurality of transversely spaced severing knives disposed along such path for engagement with such web to sever the same longitudinally into sections respectively corresponding to the widths of said rolls, a plurality of transversely spaced groove-cutting knives disposed along such path for engagement with such web respectively to cut the same along section-defining edges thereof and being supported for reciprocable displacements transversely of the web, actuating mechanism for reciprocably displacing said groove-cutting knives transversely of said web during the advancement thereof, control means for energizing said actuating mechanism in timed relation with the advancement of such web to effect at predetermined locations therealong displacement of said groove-cutting knives first in one transverse direction with respect to said web and thereafter in the opposite transverse direction with respect thereto to cut the same in a predetermined pattern along such section-defining edges, and means for winding the sectioned web in spiral convolutions to form such rolls, whereby said support elements are integrally defined in the respective rolls by the spirally wound web sections forming the same.

4. The apparatus of claim 3 in which said groove-cutting knives are each supported upon a reciprocable component for reciprocable displacement in mechanically enforced synchronism.

5. The apparatus of claim 3 in which both said severing knives and groove-cutting knives are selectively engageable with such web, and in which loading means are provided to urge said severing knives into engagement with such web and additional loading means are provided to urge said groove-cutting knives into engagement with such web.

6. The apparatus of claim 3 in which said actuating mechanism comprises a cam for effecting reciprocable displacement of said groove-cutting knives.

7. In apparatus for making a plurality of spirally wound rolls of paper toweling or the like each having a pair of integral support elements respectively located at the ends thereof, means for advancing along a predetermined path a relatively wide web of material from which such rolls are formed, a plurality of transversely spaced knives disposed along such path for engagement with such web to sever the same longitudinally into a plurality of sections respectively corresponding to the widths of said rolls, means for supporting said knives for reciprocable displacements transversely of said web in mechanically enforced synchronism to respectively cut the web along section-defining edges thereof in a predetermined pattern, actuating mechanism for reciprocably displacing said knives transversely of said web during the advancement thereof, control means for energizing said actuating mechanism in timed relation with the advancement of such web to effect at predetermined locations therealong displacement of said knives first in one transverse direction with respect to said web and thereafter in the opposite transverse direction with respect thereto to cut the same in a predetermined pattern along such section-defining edges, and means for winding the sectioned web in spiral convolutions to form such rolls, whereby said support elements are integrally defined in the respective rolls by the spirally wound web sections forming the same with one of said support elements in each roll being an inwardly extending recess and the other being an outwardly extending chuck, said control means including means responsive to the radial dimension of the rolls being wound in such spiral convolutions for energizing said actuating mechanism.

8. The apparatus of claim 7 in which said knives are selectively engageable with the web, and in which loading means are provided to urge said knives into engagement with such web.

9. The apparatus of claim 7 in which said actuating mechanism comprises a cam for effecting reciprocable displacement of said knives.

10. The apparatus of claim 9 in which said cam is configurated so that the angular lengths of the cuts formed by the inward displacement of said knives is less than the angular lengths of the cuts formed by the outward displacement thereof by an amount such that each of the support elements is substantially symmetrical.

11. In combination with a web rewinding machine having means including a rotatable platen for winding a longitudinally sectioned web in spiral convolutions upon a core-equipped mandrel to form a plurality of rolls of paper toweling or the like and having also a plurality of transversely spaced severing knives cooperatively arranged with said platen for engagement with a web being advanced thereover to sever such web longitudinally into sections respectively corresponding to the widths of such rolls, a plurality of transversely spaced groove-cutting knives cooperatively arranged with said platen for engagement with such web to respectively cut the same along section-defining edges thereof and being supported for reciprocable displacements transversely of the web, actuating mechanism for reciprocably displacing said groove-cutting knives transversely of said web during the advancement thereof from an initial position of substantial alignment with the respective severing knives, and control means for energizing said actuating mechanism in timed relation with the advancement of such web to effect at predetermined locations therealong displacement of said groove-cutting knives first in one transverse direction with respect to said web and thereafter in the opposite transverse direction with respect thereto to cut the same in a predetermined pattern along such section-defining edges, whereby a support element is integrally defined in each of said rolls by the spirally wound web section forming the same.

12. The combination of claim 11 and further including a reciprocable component carrying each of said groove-cutting knives and being connected with said actuating mechanism whereby said groove-cutting knives are displaced in mechanically enforced synchronism.

13. The combination of claim 12 in which said actuating mechanism comprises a cam for effecting displacements of said reciprocable component.

14. The combination of claim 13 in which said control means includes a one-revolution clutch having a continuously driven input element and an output element drivingly connected with said cam, and further includes means responsive to the radial dimension of the rolls being wound upon such core-equipped mandrel for effecting driving engagement between said input and output elements of said clutch to rotate said cam through a complete revolution.

15. The combination of claim 13 in which said control means includes means responsive to the radial dimension of the rolls being wound upon such core-equipped mandrel for energizing said actuating mechanism.

16. In combination with a web rewinding machine having means including a rotatable platen for winding a longitudinally sectioned web in spiral convolutions upon a core-equipped mandrel to form a plurality of rolls of paper toweling or the like and having also a plurality of transversely spaced knives cooperatively arranged with said platen for engagement with a web being advanced thereover to sever such web longitudinally into sections respectively corresponding to the widths of such rolls, means for supporting said knives for reciprocable displacements transversely of said web in mechanically enforced synchronism to respectively cut the web along section-defining edges thereof in a predetermined pattern, actuating mechanism for reciprocably displacing said knives transversely of said web during the advancement thereof, and control means for energizing said actuating mechanism in timed relation with the advancement of such web to effect at predetermined locations therealong displacement of said knives first in one transverse direction with respect to said web and thereafter in the opposite transverse direction with respect thereto to cut the same in a predetermined pattern along such section-defining edges, whereby support elements are integrally defined in the respective rolls by the spirally wound web sections forming the same with one such support element in each roll being an inwardly extending recess and the other being an outwardly extending chuck, said control means including means responsive to the radial dimension of the rolls being wound upon such core-equipped mandrel for energizing said actuating mechanism.

17. The combination of claim 16 in which said actuating mechanism comprises a cam for effecting reciprocable displacement of said knives.

18. The combination of claim 17 in which said cam is configurated so that the angular lengths of the cuts formed by the inward displacement of said knives is less than the angular lengths of the cuts formed by the outward displacement thereof by an amount such that each of the aforementioned support elements is substantially symmetrical.

19. In apparatus for making a plurality of spirally wound rolls of paper toweling or the like each having a pair of integral support elements respectively located at the ends thereof, means for advancing along a predetermined path a relatively wide web of material from which such rolls are formed, a plurality of transversely spaced knives disposed along such path for engagement with such web to sever the same longitudinally into a plurality of sections respectively corresponding to the widths of said rolls, means for supporting said knives for reciprocable displacements transversely of said web in mechanically enforced synchronism to respectively cut the web along section-defining edges thereof in a predetermined pattern, actuating mechanism for reciprocably displacing said knives transversely of said web during the advancement thereof, control means for energizing said actuating mechanism in timed relation with the advancement of such web to effect at predetermined locations therealong displacement of said knives first in one transverse direction with respect to said web and thereafter in the opposite transverse direction with respect thereto to cut the same in a predetermined pattern along such section-defining edges, and means for winding the sectioned web in spiral convolutions to form such rolls, whereby said support elements are integrally defined in the respective rolls by the spirally wound web sections forming the same with one of said support elements in each roll being an inwardly extending recess and the other being an outwardly extending chuck, said control means being operative to de-energize said actuating means for a predetermined interval at the innermost displacement of said knives, whereby each of said support elements provided by said rolls has a generally trapezoidal configuration.

20. In combination with a web rewinding machine having means including a rotatable platen for winding a longitudinally sectioned web in spiral convolutions upon a core-equipped mandrel to form a plurality of rolls of paper toweling or the like and having also a plurality of transversely spaced knives cooperatively arranged with said platen for engagement with a web being advanced thereover to sever such web longitudinally into sections respectively corresponding to the widths of such rolls, means for supporting said knives for reciprocable displacements transversely of said web in mechanically enforced synchronism to respectively cut the web along section-defining edges thereof in a predetermined pattern, actuating mechanism for reciprocably displacing said knives transversely of said web during the advancement thereof, and control means for energizing said actuating mechanism in timed relation with the advancement of such web to effect at predetermined locations therealong displacement of said knives first in one transverse direction with respect to said web and thereafter in the opposite transverse direction with respect thereto to cut the same in a predetermined pattern along such section-defining edges, whereby support elements are integrally defined in the respective rolls by the spirally wound web sections forming the same with one such support element in each roll being an inwardly extending recess and the other being an outwardly extending chuck, said actuating mechanism comprising a cam for effecting reciprocable displacement of said knives and being configurated so that the angular lengths of the cuts formed by the inward displacement of said knives is less than the angular lengths of said cuts formed by the outward displacement thereof by an amount such that each of the aforementioned support elements is substantially symmetrical, said control means being operative to de-energize said actuating mechanism for a predetermined interval at the innermost displacement of said knives, whereby each of said support elements provided by said rolls has a generally trapezoidal configuration.

21. The combination of claim 20 in which said control means includes means responsive to the radial dimension of the rolls being wound upon such core-equipped mandrel for energizing said actuating mechanism.

22. In combination with a web rewinding machine having means including a rotatable platen for winding a longitudinally sectioned web in spiral convolutions upon a core-equipped mandrel to form a plurality of rolls of paper toweling or the like and having also a plurality of transversely spaced knives cooperatively arranged with said platen for engagement with a web being advanced thereover to sever such web longitudinally into sections respectively corresponding to the widths of such rolls, means for supporting said knives for reciprocable displacements transversely of said web in mechanically enforced synchronism to respectively cut the web along section-defining edges thereof in a predetermined pattern, actuating mechanism for reciprocably displacing said knives transversely of said web during the advancement thereof, and control means for energizing said actuating mechanism in timed relation with the advancement of such web to effect at predetermined locations therealong displacement of said knives first in one transverse direction with respect to said web and thereafter in the opposite transverse direction with respect thereto to cut the same in a predetermined pattern along such section-defining edges, whereby support elements are integrally defined in the respective rolls by the spirally wound web sections forming the same with one such support element in each roll being an inwardly extending recess and the other being an outwardly extending chuck, said control means including clutch mechanism having a continuously driven input component and an output component selectively engageable therewith so as to be driven thereby, said control means further including means responsive to predetermined radial dimensions of such rolls being wound upon such mandrel to control a driving engagement between said input and output components.

23. The combination of claim 22 in which said actuating mechanism comprises a cam drivingly connected with said output component, said means responsive to the radial dimensions of such rolls being related to the configuration of said cam such that the cam rotates through less than 180° during the initial inward transverse displacement of said knives and more than 180° during the subsequent outward displacement thereof.

24. The combination of claim 23 in which the ratio of the angular rotations of said cam during the inward and outward displacements of said knives is in the order of 160° to 200°.

25. The combination of claim 22 and further comprising clutch-disengaging cam means drivingly connected with said output component and a resiliently biased cam follower, said cam means being configurated such that the resilient force applied thereto by said cam follower effects a slight rotation of said output component following disengagement thereof from said input component to further establish such disengagement and thereby prevent chattering of said clutch mechanism.

26. In a method of making a roll of toweling or the like having an integral support element at one end thereof and comprising a plurality of spirally wrapped convolutions of a web of material integrally defining such element and being of predetermined length so that a roll of known radius can be wound therefrom, the steps of advancing such web of material along a predetermined path, cutting said web longitudinally in a predetermined pattern in which such cut progresses transversely of said web in one direction for a time sufficient to advance a length of web equivalent to several convolutions of such roll when said web is wound thereinto and such cut thereafter progresses in the opposite direction for a time sufficient to advance a length of web equivalent to several convolutions of such roll when said web is wound thereinto, and winding the thusly cut web in spiral convolutions to form such roll, said support element being integrally provided by such roll along the end thereof corresponding to the aforementioned transverse cut of such web of material.

27. The method of claim 26 in which the transverse cutting of said web first progresses inwardly toward the center thereof and thereafter progresses in the opposite direction with the result that said support element constitutes a recess in an end of such roll.

28. The method of claim 26 in which the transverse cutting of said web first progresses outwardly away from the center thereof and thereafter progresses in the opposite direction with the result that said support element constitutes a chuck projecting outwardly from an end of such roll.

29. In a method of making a roll of toweling or the like having a pair of integral support elements respectively located at the ends thereof and comprising a plurality of spirally wrapped convolutions of a web of material integrally defining such elements and being of predetermined length so that a roll of known radius can be wound therefrom, the steps of advancing such web of material along a predetermined path, cutting said web longitudinally at transversely spaced locations respectively corresponding to the ends of a roll wound from such web and in predetermined patterns in which each of said cuts progresses transversely of said web in one direction for a time sufficient to advance a length of web equivalent to several convolutions of such roll when said web is wound thereinto and such cut thereafter progresses in the opposite direction for a time sufficient to advance a length of web equivalent to several convolutions of such roll when said web is wound thereinto, and winding the thusly cut web in spiral convolutions to form such roll, said support elements being integrally provided by such roll along the respective ends thereof.

30. The method of claim 29 in which said cuts progress at the same time in the same transverse directions whereby one of said support elements constitutes a recess in an end of such roll and the other constitutes an outwardly projecting chuck at the other end of such roll.

31. In a method of making concurrently a plurality of rolls of toweling of the like each having an integral support element at one end thereof and each comprising a plurality of spirally wrapped convolutions of a web of material integrally defining the associated element and being of predetermined length so that rolls of known radius can be wound therefrom, the steps of advancing a relatively wide web along a predetermined path, forming a plurality of sections from said web respectively corresponding to the widths of such rolls and contouring at least one longitudinal edge portion of each such section at predetermined locations therealong to selectively remove material therefrom or add material thereto, each length of material so removed from or added to said sections being equivalent to several convolutions of such a roll, and winding the web sections in spiral convolutions to form rolls therefrom, said support elements being integrally provided by the respectively associated rolls along the ends thereof corresponding to the aforementioned contoured edge portions.

32. In a method of making concurrently a plurality of rolls of toweling or the like each having an integral support element at one end thereof and each comprising a plurality of spirally wrapped convolutions of a web of material integrally defining the associated element and being of predetermined length so that rolls of known radius can be wound therefrom, the steps of advancing a relatively wide web of material along a predetermined path, severing said web longitudinally into sections respectively corresponding to the widths of such rolls, cutting each web section along a longitudinal edge portion in a predetermined pattern in which each such cut progresses transversely of the associated web section in one direction for a time sufficient to advance a length of web section equivalent to several convolutions of the roll into which said web section is wound and in which each such cut thereafter progresses transversely of the associated web section in the opposite direction for a time sufficient to advance a length of web section equivalent to several convolutions of the roll into which said web section is wound, and winding the thusly cut web sections in spiral convolutions to form such rolls, each of said support elements being integrally provided by the respective rolls along the ends thereof corresponding to the aforementioned edge portions.

33. The method of claim 32 in which the cutting of each web section along the aforesaid edge portion thereof first progresses inwardly toward the center of the section and thereafter progresses in the opposite direction with the result that each of said support elements constitutes a recess in an end portion of the associated roll.

34. The method of claim 32 in which the cutting of each web section along the aforesaid edge portion thereof first progresses outwardly away from the center of the section and thereafter progresses in the opposite direction with the result that each of said support elements constitutes a chuck in an end portion of the associated roll.

35. In a method of making concurrently a plurality of rolls of toweling or the like each having a pair of integral support elements respectively located at the ends thereof and each comprising a plurality of spirally wrapped convolutions of a web of material integrally defining the associated elements and being of predetermined length so that rolls of known radius can be wound therefrom, the steps of advancing a relatively wide web of material along a predetermined path, severing said web longitudinally into sections respectively corresponding to the widths of such rolls and at predetermined locations along said web effecting progressive displacement of each such severance transversely of the web in one direction for a time sufficient to advance a length of web section equivalent to several convolutions of the roll into which such web section is wound and thereafter effecting progressive displacement of each such severance in the opposite direction in a preestablished pattern for a time sufficient to advance a length of web section equivalent to several convolutions of the roll into which such web section is wound, and winding the thusly cut web sections in spiral convolutions to form such rolls, each of said support elements being integrally provided by the respective rolls at the ends thereof.

36. The method of claim 35 in which said lines of severance are displaced at the same time in the same transverse directions whereby one of said support elements in each of such rolls is a recess formed in one end thereof and the other of said support elements in each roll is an outwardly projecting chuck provided at the other end thereof.

37. In a method of making concurrently a plurality of rolls of paper toweling or the like each having an integral support element at one end thereof and each comprising a plurality of spirally wrapped convolutions of a web of material integrally defining the associated element and being of predetermined length so that rolls of known radius can be wound therefrom, the steps of advancing a relatively wide web of material along a predetermined path, providing a mandrel equipped with a core severed into lengths respectively corresponding to the widths of such rolls, continuously severing said web longitudinally into sections respectively corresponding to the widths of such rolls, periodically cutting each of said web sections along a longitudinal edge portion thereof in a predetermined pattern in which each such cut progresses transversely toward the center of the associated section from a location of substantial coincidence with the corresponding line of severance formed by the aforesaid severing of said web and for a time sufficient to advance a length of web section equivalent to several convolutions of the roll into which such web section is wound and in which each such cut thereafter progresses in the opposite transverse direction away from the center of the associated section for a time sufficient to advance a length of web section equivalent to several convolutions of the roll into which such web section is wound and to a location of substantial coincidence with such corresponding line of severance, and winding the thusly cut web sections onto the correspondingly severed core in spiral convolutions to form such rolls, each of said support elements being a recess integrally provided by the associated rolls at one end thereof.

38. The method of claim 37 in which the angular length of each of said cuts from the innermost to the outermost transverse position thereof is greater than its angular length from the outermost to the innermost transverse position thereof by an amount such that the recess formed thereby is substantially symmetrical.

39. In a method of making concurrently a plurality of rolls of paper toweling or the like each having a pair of integral support elements respectively located at the ends thereof and each comprising a plurality of spirally wrapped convolutions of a web of material integrally defining the associated elements and being of predetermined length so that rolls of known radius can be wound therefrom, the steps of advancing a relatively wide web of material along a predetermined path, providing a mandrel equipped with a core severed into lengths respectively corresponding to the widths of said rolls, continuously severing said web longitudinally into sections respectively corresponding to the widths of said rolls, periodically effecting progressive displacement of each such severance transversely toward the center of the associated section for a time sufficient to advance a length of web section equivalent to several convolutions of the roll into which such web section is wound and thereafter effecting progressive displacement of each such severance in the opposite transverse direction away from the center of the associated section to the initial position thereof and for a time sufficient to advance a length of web section equivalent to several convolutions of the roll into which such web section is wound, and winding the web sections onto the correspondingly severed core in spiral convolutions to form such rolls, each pair of support elements being a recess provided by a roll at one end thereof and an outwardly projecting chuck at its other end, the material removed from one web section by the transverse displacement of the associated line of severance being the material forming the chuck provided by the adjacent web section and roll wound therefrom.

40. The method of claim 39 in which the angular length of each line of severance resulting from said displacement is greater from the innermost to the outermost transverse position thereof than from its outermost to the innermost position by an amount such that each of the support elements formed thereby is substantially symmetrical.

41. The method of claim 40 in which said displacement incrementally progresses inwardly, is maintained at such inner most position for a predetermined interval of time sufficient to advance a length of web equivalent to several convolutions of the roll into which said web section is wound, and then incrementally progresses outwardly, whereby the recesses and chucks provided by said rolls have a generally trapezoid configuration.

References Cited by the Examiner

UNITED STATES PATENTS

| | | | |
|---|---|---|---|
| 449,057 | 3/1891 | Perkins | 83—428 |
| 1,021,028 | 3/1912 | Wescott | 83—428 |
| 1,095,661 | 5/1914 | Moulton | 242—56.4 |
| 2,425,123 | 8/1947 | Quayle et al. | 242—56.2 |
| 2,672,198 | 3/1954 | Jones et al. | 242—56.2 |
| 2,929,496 | 3/1960 | Muehleback et al. | 206—65 |
| 2,983,372 | 5/1961 | Amatel et al. | 206—65 |
| 3,029,035 | 4/1962 | Layton | 206—58 |
| 3,038,598 | 6/1962 | Layton et al. | 206—58 |
| 3,162,391 | 12/1964 | Westcott et al. | 242—56.2 |

FOREIGN PATENTS 805,836   12/1958   Great Britain.

JORDAN FRANKLIN, *Primary Examiner.*

FRANK J. COHEN, *Examiner.*

J. R. BOLER, *Assistant Examiner.*